Figure 1:
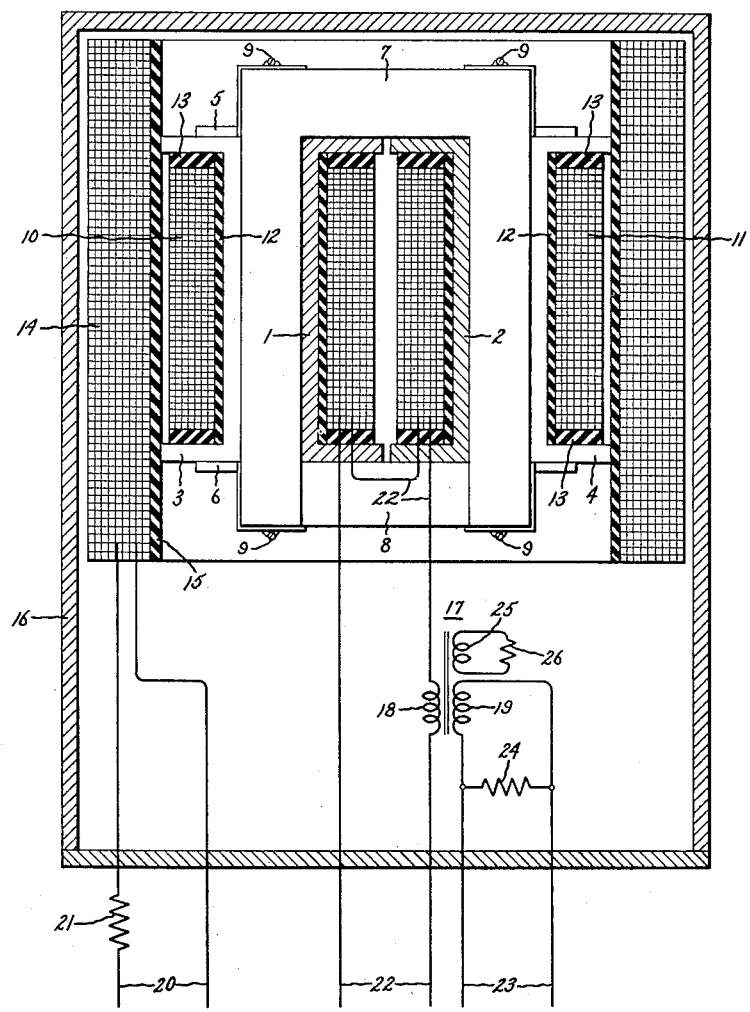

March 31, 1953

C. W. HEWLETT, JR 2,633,561

SATURABLE CORE CONVERTER

Filed June 5, 1952

2 SHEETS—SHEET 1

Inventor:
Clarence W. Hewlett, Jr.,
by Richard E. Hosley
His Attorney.

March 31, 1953  C. W. HEWLETT, JR  2,633,561
SATURABLE CORE CONVERTER

Filed June 5, 1952

2 SHEETS—SHEET 2

Inventor:
Clarence W. Hewlett, Jr.,
by Richard E. Hasley
His Attorney.

Patented Mar. 31, 1953

2,633,561

UNITED STATES PATENT OFFICE 2,633,561

SATURABLE CORE CONVERTER

Clarence W. Hewlett, Jr., Marblehead, Mass., assignor to General Electric Company, a corporation of New York Application June 5, 1952, Serial No. 291,925

4 Claims. (Cl. 321—43)

My invention relates to improvements in saturable core magnetic devices for converting small direct currents into alternating currents, and has for its principal object the provision of an improved saturable core converter of simple, rugged contruction, adapted to more economical manufacture than comparable converters heretofore known. Other objects and advantages will appear as the description proceeds.

Briefly stated, my improved converter comprises two slotted spools each bearing a direct current winding. The saturable core consists of two U-shaped laminations, the respective legs of which extend into the slots from opposite ends of the two spools. An alternating current winding surrounds both spools. No expensive toroidal windings are required, and assembly of the parts is exceedingly simple. This structure fits into the upper portion of a cylindrical metal case. A transformer and other required circuit elements may be placed in the lower portion of the same case.

My invention will be better understood from the following description taken in connection with the accompanying drawing, and its scope will be pointed out in the appended claims.

Figure 2:
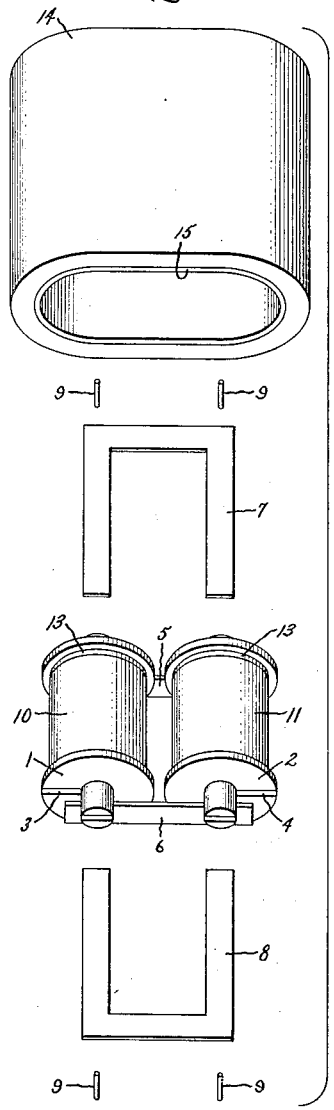
Figure 3:
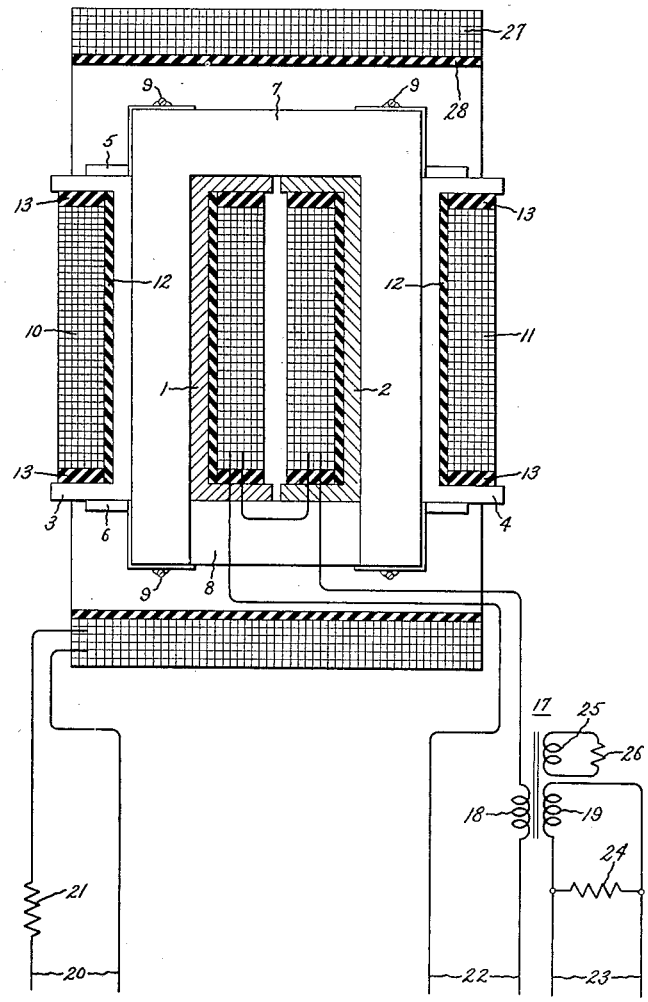

In the drawing,

Fig. 1 is a partly schematic section view of an improved saturable core converter, Fig. 2 is an exploded view of the same converter showing details of carious parts, and Fig. 3 is a partly schematic section view of another improved saturable core converter.

Referring now to Figs. 1 and 2 of the drawing, two similar spools, 1 and 2, are made of a suitable non-magnetic material such as brass. By non-magnetic material, I mean any of the paramagnetic or dimagnetic materials which have relatively small permeabilities in contrast to the ferromagnetic materials. Each spool has a slot, shown at 3 and 4 respectively, which extends radially inward through the axis of the spool. These slots have two purposes: first, they provide spaces for the legs of the core members as hereinafter described, and second they interrupt the flow of eddy currents around the spools. Two, or more, brass strips 5 and 6 are soldered or otherwise fastened across the ends of both spools as shown to hold the spools laterally adjacent and parallel to each other with their slots in a common plane.

A saturable magnetic core consists of two similar U-shaped laminations 7 and 8, made of ferromagnetic material. The legs of these U-shaped members respectively extend into the slots from opposite ends of the spools, as shown. The core laminations are held in place by wires 9 soldered or otherwise fastened across each end of the spools.

Similar direct current windings 10 and 11 are placed upon spools 1 and 2 respectively. Preferably, one or more layers of varnished cambric 12 are wrapped around the center portion of each spool, and a fiber washer 13 is placed at each end of each spool, as shown, to insure good insulation between the windings and the spools. The windings 10 and 11 may each consist of about 750 turns of .007" diameter copper wire.

An alternating current winding 14 surrounds both spools as shown. Preferably, winding 14 is made by first wrapping a piece of insulation 15 around the two spools, and then winding 165 turns of .0142" diameter copper wire around the insulation. This winding may conveniently consist of four layers of 41 or 42 turns each, separated by stiff paper to keep the turns in order.

In manufacture, the direct current windings are placed on the spools before the two spools are fastened together. The spools are then fastened together by soldering strips 5 and 6 across the ends, and then the alternating current winding 14 is placed around the two spools. The saturable core laminations are inserted after all the windings are in place. This makes it possible to try several sets of laminations to select a set which will produce the smallest induced noise voltage in the direct current windings when the alternating current winding is excited. The simplicity of construction and assembly permits very economical manufacture.

The structure thus far described is placed in the upper portion of a cylindrical ferromagnetic case 16, which provides shielding against external magnetic fields. A transformer 17, having a primary winding 18 and a secondary winding 19, and other circuit elements, may be placed in the lower portion of the same ferromagnetic case.

Connections 20 and a series resistor 21, mounted external to the case, are provided for applying alternating current to winding 14. Connections 22 join the direct current windings, 10 and 11, in series with each other and with primary winding 18, and provide means for applying direct current to windings 10 and 11.

When, for example, a 400 cycle per second alternating voltage having an R. M. S. value of about 6.3 volts is applied across winding 14 and resistor 21 in series, through connections 20, with no excitation of the direct current windings, the core members 7 and 8 are saturated twice per cycle by the resulting magnetic flux. Equal voltages containing only odd harmonics of 400 cycles are induced in windings 10 and 11, which are connected in series bucking relation so that substantially all frequency components are balanced out.

Assume now that, in addition, a small direct current is passed through windings 10 and 11 through connections 22. This provides additional magnetic flux which, due to the non-linear magnetic properties of the saturable core, upsets the balance of voltages induced in coils 10 and 11 respectively, and introduces a component having the second harmonic frequency of 800 cycles per second. With respect to this second harmonic frequency component, windings 10 and 11 are in series aiding relation, and current of the second harmonic frequency flows through primary winding 18. This induces in secondary winding 19 a voltage of the second harmonic frequency which has an amplitude proportional to the magnitude of direct current provided through connections 22, and which has a phase dependent upon the direction of such direct current flow. Thus the device converts small direct signals applied to connections 22 into 800 cycle per second alternating voltage signals across secondary winding 19.

Output connections 23 are connected to secondary winding 19 as shown. Transformer 17 may provide a step-up ratio of 30 to 1. In some applications a resistor 24 may be added to load the transformer 17, or this loading may be accomplished by the addition of another transformer secondary winding 25 and a resistor 26.

Fig. 3 shows another saturable core converter which is similar to the one described above in all respects except the arrangement of its alternating current winding. In the embodiment illustrated by Figs. 1 and 2, the axis of alternating current winding 14 is parallel to the axes of spools 1 and 2. In the embodiment illustrated by Fig. 3, the axis of alternating current winding 27 is perpendicular to the axes of spools 1 and 2. Winding 27 may, for example, comprise 112 turns of 0.0113 inch diameter copper wire wound about a cylindrical insulating base 28.

What I claim as new and desire to obtain by Letters Patent of the United States is:

1. A saturable core converter comprising two similar non-magnetic spools each having a slot extending radially inward through its axis, at least two strips respectively fastened across ends of both spools to hold said spools laterally adjacent and parallel to each other with their slots in a common plane, at least two similar U-shaped saturable ferromagnetic core members respectively having legs extending into said slots from opposite ends of said spools, similar direct current windings upon each of said spools, and an alternating current winding surrounding both spools.

2. A converter as in claim 1 in which the axis of the alternating current winding is parallel to the axes of the two spools.

3. A converter as in claim 1 in which the axis of the alternating current winding is perpendicular to the axes of the two spools.

4. A saturable core converter comprising two similar non-magnetic spools each having a slot extending radially inward through its axis, at least two strips respectively fastened across ends of both spools to hold said spools laterally adjacent and parallel to each other with their slots in a common plane, at least two similar U-shaped saturable ferromagnetic core members respectively having legs extending into said slots from opposite ends of said spools, wires fastened across each end of said spools to hold said core members in place, similar direct current windings upon each of said spools, an alternating current winding surrounding both spools, a cylindrical ferromagnetic case surrounding said alternating current winding, a transformer having a primary winding and a secondary winding, connections for applying alternating current to said alternating current winding, whereby equal alternating voltages are induced in said direct current windings, connections joining said direct current windings in series with each other and with said primary winding and for applying direct current thereto, whereby second harmonic frequency components are produced in the voltages induced in the direct current windings, said direct current windings being connected in series bucking relation with respect to fundamental frequency components of induced voltage and in series aiding relation with respect to the second harmonic frequency components, whereby alternating voltage of the second harmonic frequency is induced in said secondary winding upon application of direct current to said direct current windings and output connections to said secondary winding.

CLARENCE W. HEWLETT, Jr.

REFERENCES CITED

The following references are of record in the file of this patent:

UNITED STATES PATENTS

| Number | Name | Date |
|---|---|---|
| 2,053,154 | La Pierre | Sept. 1, 1936 |